(12) United States Patent
Whyte

(10) Patent No.: US 9,565,251 B2
(45) Date of Patent: Feb. 7, 2017

(54) METHOD AND APPARATUS TO REDUCE FLASH MEMORY DEVICE PROGRAMMING TIME OVER A C.A.N. BUS

(71) Applicant: Continental Automotive Systems, Inc., Auburn Hills, MI (US)

(72) Inventor: Graeme Davidson Whyte, Arlington Heights, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 584 days.

(21) Appl. No.: 13/646,926

(22) Filed: Oct. 8, 2012

(65) Prior Publication Data

US 2013/0254462 A1    Sep. 26, 2013

Related U.S. Application Data

(60) Provisional application No. 61/615,532, filed on Mar. 26, 2012.

(51) Int. Cl.
*H04L 29/08* (2006.01)

(52) U.S. Cl.
CPC ......... *H04L 67/1097* (2013.01); *H04L 69/324* (2013.01)

(58) Field of Classification Search
CPC .................. H04L 67/1097; H04L 69/324
See application file for complete search history.

(56) References Cited

U.S. PATENT DOCUMENTS

| 2005/0141273 A1 | 6/2005 | Park et al. |
| 2007/0180443 A1 | 8/2007 | Kondo et al. |
| 2010/0306457 A1* | 12/2010 | Wilson et al. ................ 711/104 |

FOREIGN PATENT DOCUMENTS

| CN | 1728500 A | 2/2006 |
| JP | 2005141420 A | 6/2005 |

OTHER PUBLICATIONS

Search Report dated Jul. 10 2012, from corresponding GB Patent Application No. 1206409.3.

* cited by examiner

*Primary Examiner* — Gary W Cygiel

(57) ABSTRACT

Data frames, such as Controller Access Network frames, that are to be programmed into a FLASH memory device, are sent from a programming station to a target device via a relatively high-speed bus and stored temporarily at the target device in numbered frame buffers. Each frame carries a payload. Before a frame is sent, an identifier is assigned to it, or an identifier is appended to the frame. The identifier identifies a particular buffer in the target device where the frame is to be stored in the target device until the target device is able to process the frame and write its payload into a FLASH memory device.

7 Claims, 5 Drawing Sheets

METHOD AND APPARATUS TO REDUCE FLASH MEMORY DEVICE PROGRAMMING TIME OVER A C.A.N. BUS

BACKGROUND

As used herein, a bus is considered to be one or more conductors in a computer system that form a main transmission path for electrical signals that represent information. The Controller Area Network or C.A.N. is a well-known bus standard that was originally designed to allow microcontrollers and related devices to communicate with each other within a vehicle without a host computer arbitrating the communications. The C.A.N. is a message-based protocol designed specifically for automotive and transportation applications but also now used in other areas such as industrial automation and medical equipment. Information is carried over a C.A.N. bus in frames, the structures of which are defined in the C.A.N. specification. A "frame" is considered to be a collection of binary digits or "bits" representing a block of data. Behrouz A. Forouzan, "Data Communications and Networking," Fourth Ed., pp 1082.

FIG. 1 depicts an example of a C.A.N. data frame 100. The frame 100 is comprised of several different fields 102, some of which are single-bit fields, others being multi-bit fields. The first field 104 is a single-bit start-of-frame field located in the first bit position. The next eleven bits are an identifier field 106, which is typically used to represent the priority of the data frame 100. The next three bits comprise three individual fields, 108, 110 and 112, which are a remote transmission request or RTR bit/field, and identifier extension bit or IDE bit/field and a reserved bit/field. They are followed by a four-bit field denominated as the data length code field 114. The data length code or DLC field of four bits represents the number of bytes of data in the next field which is the data field or payload field 116. Under the C.A.N. standard, the data field or payload field 116 can be up to 64 bits or eight, 8-bit bytes. A cyclic redundancy check or CRC field 118 of 15 bits follows the payload field 116 and is followed by various other "housekeeping" bit fields 120, 122 and 124. The frame 100 ends with an end-of-frame field 126 of seven bits.

C.A.N.-based communications are commonly used to program devices found in automobiles and other transportation equipment. Such programming typically involves transmitting files from a programming station to a microcontroller. Programming frequently includes writing or programming one or more files into a FLASH memory device. According to the I.E.E.E. Standards Dictionary of 2011, a FLASH memory device is an electrically erasable programmable read-only memory (EEPROM) in which clearing and programming can be performed only on blocks or the entire array.

As used herein, a file is considered as being a collection of related data, i.e., binary digits, examples of which include text or a program, which is treated by a computer as a single unit, especially for purposes of input and output. Files include representations of executable instructions for a computer or other processor as well as data.

The inventor has identified shortcomings associated with transmitting files over a C.A.N. bus, including that programming a FLASH memory device takes a significant amount of time. The time required to program a FLASH memory device with even a few hundred bytes of data usually takes much more time than it does to send those few hundred data bytes over a C.A.N. bus. As a result, a C.A.N. bus is frequently used inefficiently by having to wait for a FLASH programming device to receive C.A.N. data frames, extract the payload information from them and copy or write that information into a FLASH memory device. A method and apparatus by which a C.A.N. bus could be used more efficiently to transfer especially large data files would be an improvement over the prior art.

BRIEF SUMMARY

Data frames, such as Controller Access Network frames, that are to be programmed into a FLASH memory device, are sent from a programming station to a target device via a relatively high-speed bus and stored temporarily at the target device in numbered frame buffers. Each frame carries a payload. Before a frame is sent, an identifier is assigned to it, or an identifier is appended to the frame. The identifier identifies a particular buffer in the target device where the frame is to be stored in the target device until the target device is able to process the frame and write its payload into a FLASH memory device.

DETAILED DESCRIPTION

Figure 2:
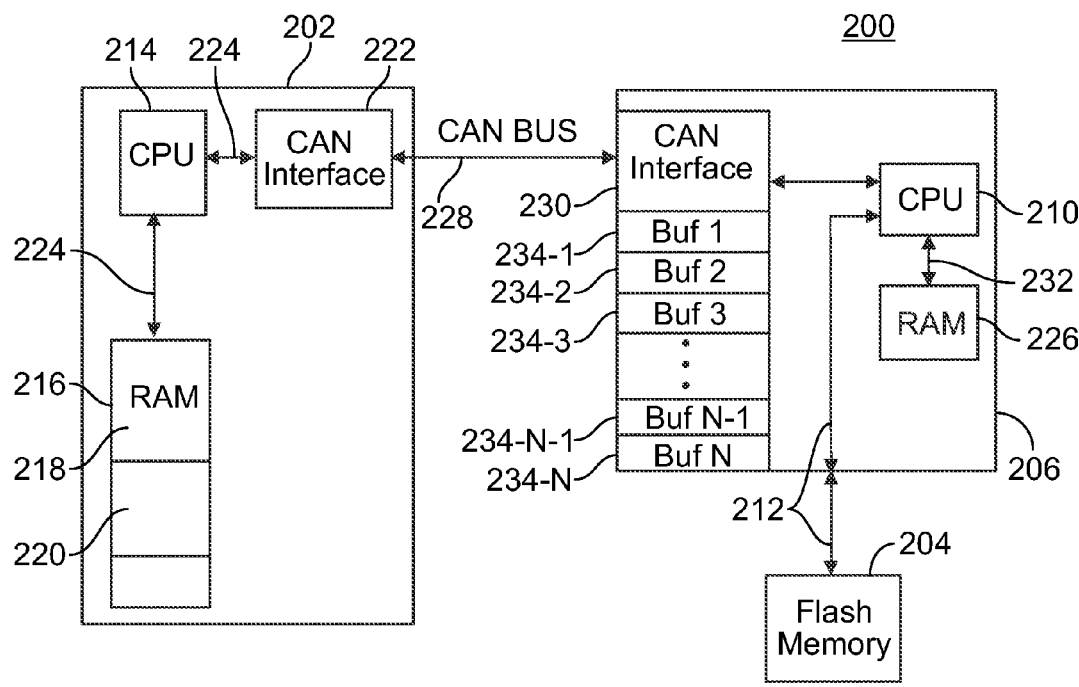
FIG. 2 is a block diagram of a system for transmitting information from a FLASH programming station to a target device where program and/or data information from a FLASH station is to be used.

FIG. 2 depicts an apparatus or system 200 for programming FLASH memory devices over a C.A.N. bus and for reducing the amount of time required of a programming station 202 to accomplish the programming of a FLASH memory device 204 by a target device 206. The target device 206 is typically a microcontroller that has FLASH memory co-located on the same silicon die as an associated central processing unit (CPU) 210, or it is coupled to a separate, external-to-the target device FLASH memory device 204 by an address/control bus 212 that extends between the CPU 210 and the external FLASH memory device 204. In an embodiment, the target device 206 is a PowerPC® 561. Other suitable target devices may also be used.

A FLASH programming device 202, which is also referred to herein as a FLASH station 202, may include a personal computer or work station having a CPU or central processing unit 214 coupled to one or more memory devices 216 wherein program instructions 218 and/or data 220 are stored. The program instructions 218 and/or data 220 can be for either the FLASH programming device CPU 214 or for a CPU 210 located on a target device 206. For purposes of this disclosure, references to the instructions 218 and data 220 stored in the FLASH programming device are for use by the target device, e.g. the PowerPC® 561, and transmitted to the target device to be programmed by the target device 206 into a FLASH memory device 204.

The FLASH station 202 includes a C.A.N. interface 222 that is operatively coupled to the CPU 214 via a conventional address/data bus 224. The same bus 224 or an equivalent thereof couples the CPU 214 to the memory device 216 where the instructions 218 and data 220 for the target device 206 are stored. The CPU 214 is thus able to read the contents of the memory device 216, format the contents of the memory device 216 into C.A.N. frames, and write or send those frames to the C.A.N. interface 222.

The C.A.N. interface 222 is a device well known to those of ordinary skill in the art, which is coupled to a C.A.N. bus 228 that is itself coupled to another, second C.A.N. interface 230. The second C.A.N. interface 230 may be a collection of electronic circuits that are co-located on the same silicon die as is the CPU 210. The second C.A.N. interface 230 thus forms or comprises part of the target device 206.

C.A.N. interfaces are known in the art. Among other things, they transmit C.A.N. data frames onto a C.A.N bus and receive C.A.N. data frames from a bus. In the FLASH station 202, the C.A.N. interface 222 forwards C.A.N. frames to the CPU 214 and receives C.A.N. frames from the CPU 214. Stated another way, the C.A.N. interface 222 acts to transfer C.A.N. frames between the CPU 214 and the C.A.N. bus 228. It also handles formatting and timing requirements related thereto.

At the other end of the C.A.N. bus 228, the target device 206, which is also referred to herein as a FLASH programming device 206 is comprised of a CPU 210 that is coupled to a memory device 226 via a conventional address and data bus 232. Program instructions and data stored in the memory device 226 imbue the CPU 210 with the ability to perform various operations including programming a FLASH memory device 204.

Figure 1:
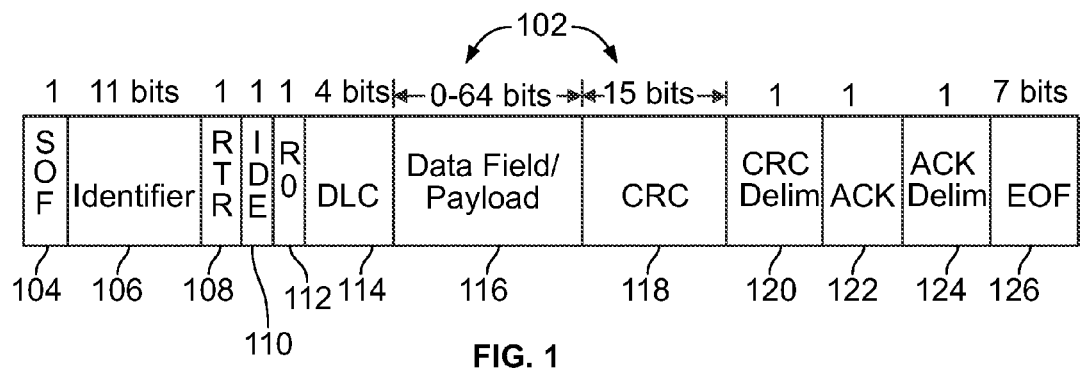
FIG. 1 is a depiction of a C.A.N. data frame.

In FIG. 2, the FLASH memory device 204 is configured to be programmed with instructions and/or data that the CPU 210 received from its local C.A.N. interface 230. In an embodiment, the C.A.N. interface 230 receives C.A.N. data frames, such as the data frame 100 shown in FIG. 1. As shown in FIG. 1, a C.A.N. frame is comprised of a payload that is encapsulated in various fields. A function of at least one of the CPU 210 and the C.A.N. interface 230 is to strip off over-head fields and bits to recover the payload, which is then programmed into a FLASH memory device 204.

The time required to program a FLASH memory device 204 can exceed the time required to receive C.A.N. frames from the programming station 202. Stated another way, C.A.N. data frames are typically sent over the C.A.N. bus 228 at a rate that is much faster than the CPU 210 can receive frames, strip off overhead data and fields, and write the data or payload to a FLASH memory device 204.

In order to use the C.A.N. bus 228 more efficiently, i.e., without slowing the transmission of C.A.N. data frames from the FLASH station 202, the target device 206 is configured to have a C.A.N. interface 230 that is configured or arranged to be able to store complete C.A.N frames into individually addressable, individually readable and individually writable, C.A.N. frame buffers 234-1 through 234-N.

A buffer is considered herein to be a temporary storage unit or device, such as a "latch" or flip-flop circuit regardless of how it is implemented. "Buffer" also includes multiple latches and multiple flip-flops that are configured to store one or more binary digits that comprise a frame. A buffer stores information at least until the stored binary digits are read out of the buffer, over-written with other binary digits, or the buffer is reset, i.e., erased. A buffer can be loaded serially or in parallel. The PowerPC® 561 has several C.A.N. buffers that are part of the silicon die on which the PowerPC® 561 device is fabricated.

In an embodiment, incoming C.A.N. data frames that are received by the C.A.N. interface 230 are written by the interface 230 into a particular one of the on-chip buffers 234-1 through 234-N. The destination buffer is uniquely and unambiguously identified by a C.A.N. message identifier that is appended to each of the C.A.N. frames prior to its transmission by the FLASH station 202. A message identifier for a C.A.N. frame, an Ethernet frame, I.E.E.E. 802.3 frame, or any other type of frame can be "appended" to the frame by encapsulation or by "re-purposing" one or more existing bit fields or data fields of a frame. In an embodiment, the FLASH station 202 appends a C.A.N. message identifier to a C.A.N. frame to specify where a frame is to be stored in a target device. The C.A.N. message identifier appended to a C.A.N. message identifies with particularity, a specific buffer in the target device 206 into which the corresponding C.A.N. frame will be written and stored. C.A.N. frames are stored in the buffers until such time that the CPU 224 can retrieve the C.A.N. frame from the C.A.N. buffer and process it for storage into the FLASH memory device 204, i.e., strip off the header and trailer information, i.e., un-encapsulate the payload field. Having several C.A.N. buffers 234-1 through 234-N in a target device 206 thus enables a sending C.A.N. interface 222 to transmit C.A.N. data frames virtually continuously, i.e., at the full speed of the bus 228. It also allows the C.A.N. interface 230 in the target device 206 to store them autonomously, i.e. without requiring intervention from the CPU 224, and thus save incoming frames until such time that the CPU 210 of the target device 206 is able to process the payload in each frame for storage into the memory device 204.

Figure 3:
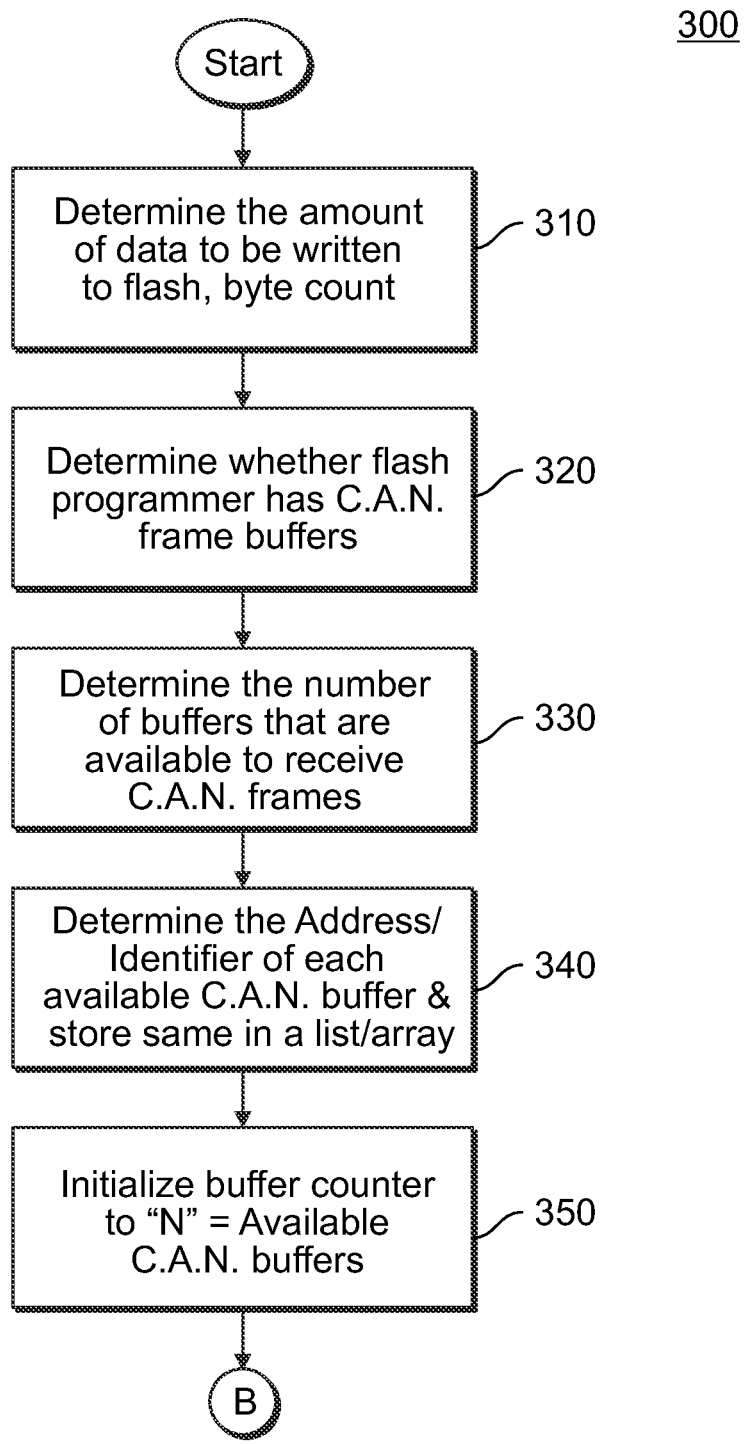
FIGS. 3 and 4 is a depiction of a method of storing information in the payload portions of C.A.N. data frames, into a FLASH memory device.

FIG. 3 depicts steps of a method 300 of storing information in the payload portions of controller area network or "C.A.N." data frames. The payload portions are to be written into (programmed into) a FLASH memory device that is coupled to a remotely-located FLASH programming device, i.e., a target device, that has two or more, or "N," C.A.N. frame buffers available to store complete C.A.N. frames.

At step 310, the method determines an amount of data to be written into a FLASH memory device. Such a determination can be made several ways and the exact method of the determination is not germane. In an embodiment, step 310 is comprised of determining a byte count, i.e., a number of data bytes, to be written into the FLASH memory.

At step 320, the method 300 determines whether a FLASH programmer, e.g., a target device such as the target device 206, has dedicated C.A.N. frame buffers that are able to receive and hold C.A.N. frames, i.e., frame buffers that are available. More particularly, step 320 determines whether or not a FLASH programmer has dedicated C.A.N. frame buffers of the type that can receive a complete C.A.N. frame and store the frame while a FLASH programming device processes previously-stored data, or performs other functions.

At step 330, if dedicated C.A.N. frame buffers exist, the number of such available buffers is determined and in step 340, the address or other identifier of each available buffer is determined. Additionally in step 340, the addresses or identifiers of the available buffers are stored in a list or an array from which they can be retrieved for later use during a transmission session.

A counter is initialized at step 350 and set equal to the number of available C.A.N. buffers. As used herein, the number of such available buffers is identified as "N." In the case of the Power PC® 561, there can be as many as forty-eight buffers, the addresses/identifiers of which are also programmable.

Figure 4:
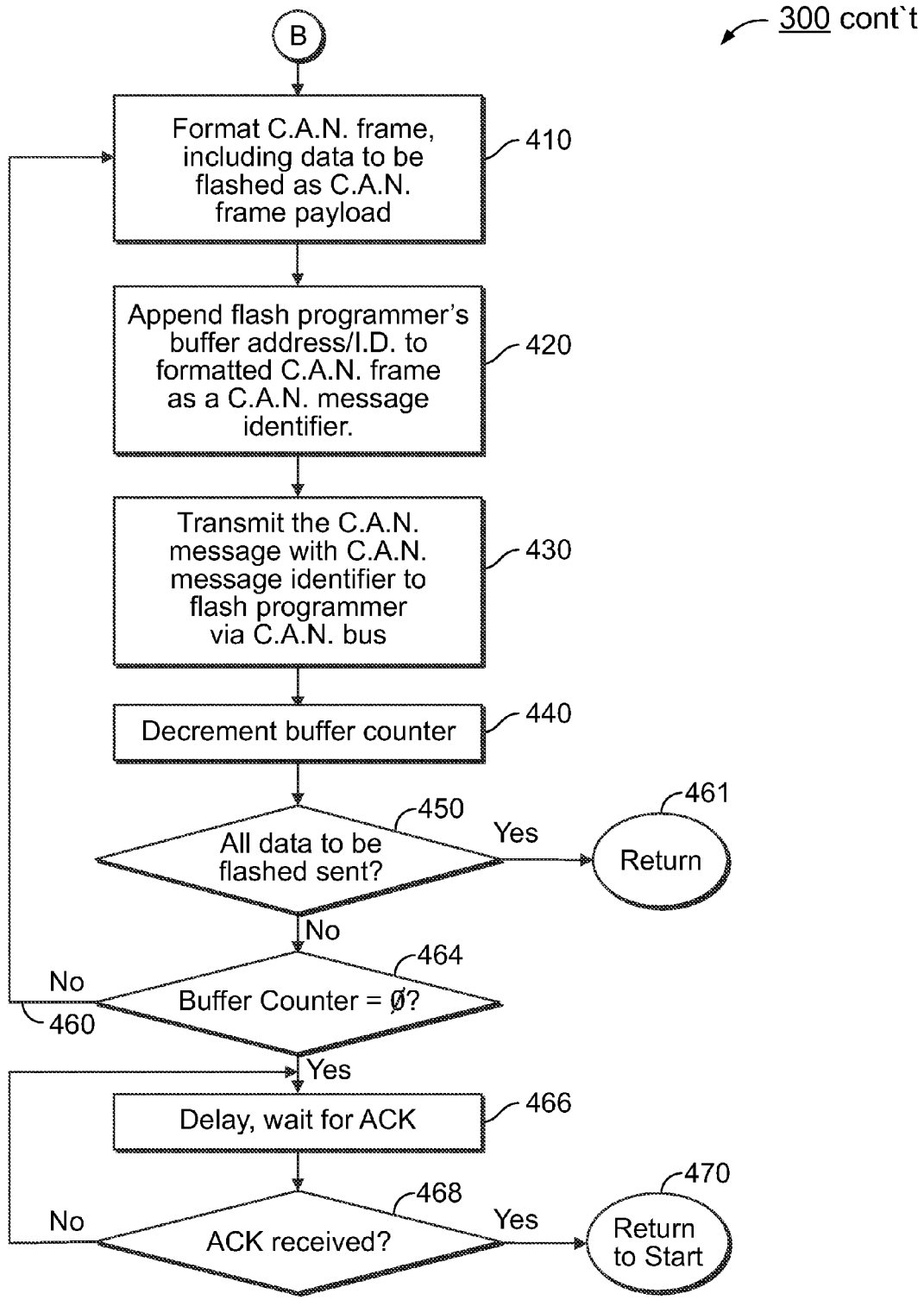

Referring now to FIG. 4, the method shown in FIG. 3 continues at step 410, where the processer or CPU 208 in the FLASH programming station 202 formats a C.A.N. frame, such as the frame depicted in FIG. 1 or a derivative thereof. The C.A.N. frame that is formatted in step 410 has a frame payload obtained from the data and/or program instructions stored in memory 210.

At step 420, a C.A.N. message identifier is appended to the C.A.N. frame that was created in step 410. The C.A.N. message identifier is an address or identifier of a particular C.A.N. frame buffer in a C.A.N. programming device 206 the function of which is to take the contents of the payload and program it into a FLASH memory device.

The C.A.N. frame having the C.A.N. message identifier that is created in step 420 is transmitted over the C.A.N. bus 220 at step 430. In step 440, the buffer counter is decremented followed by a test at step 450 of whether there are additional data and/or program instructions to be "FLASHed."

If all of the data to be programmed into the FLASH memory device has been sent, the method proceeds to step 460 where the method 300 ends. If additional data is to be sent, and the buffer counter is not equal to zero, the method 300 proceeds to step 460 where the next C.A.N. frame is formatted at step 410. If at step 465, the buffer counter is equal to zero, the method waits for an acknowledgement or "ACK" signal 466 from the target device. At step 468, a test is executed to determine whether or not an acknowledgement was received. The program continues to loop through steps 466 through 468 until that ACK is received. Once the ACK is received, at step 470 the method returns to the start or initial step 310.

Figure 5:
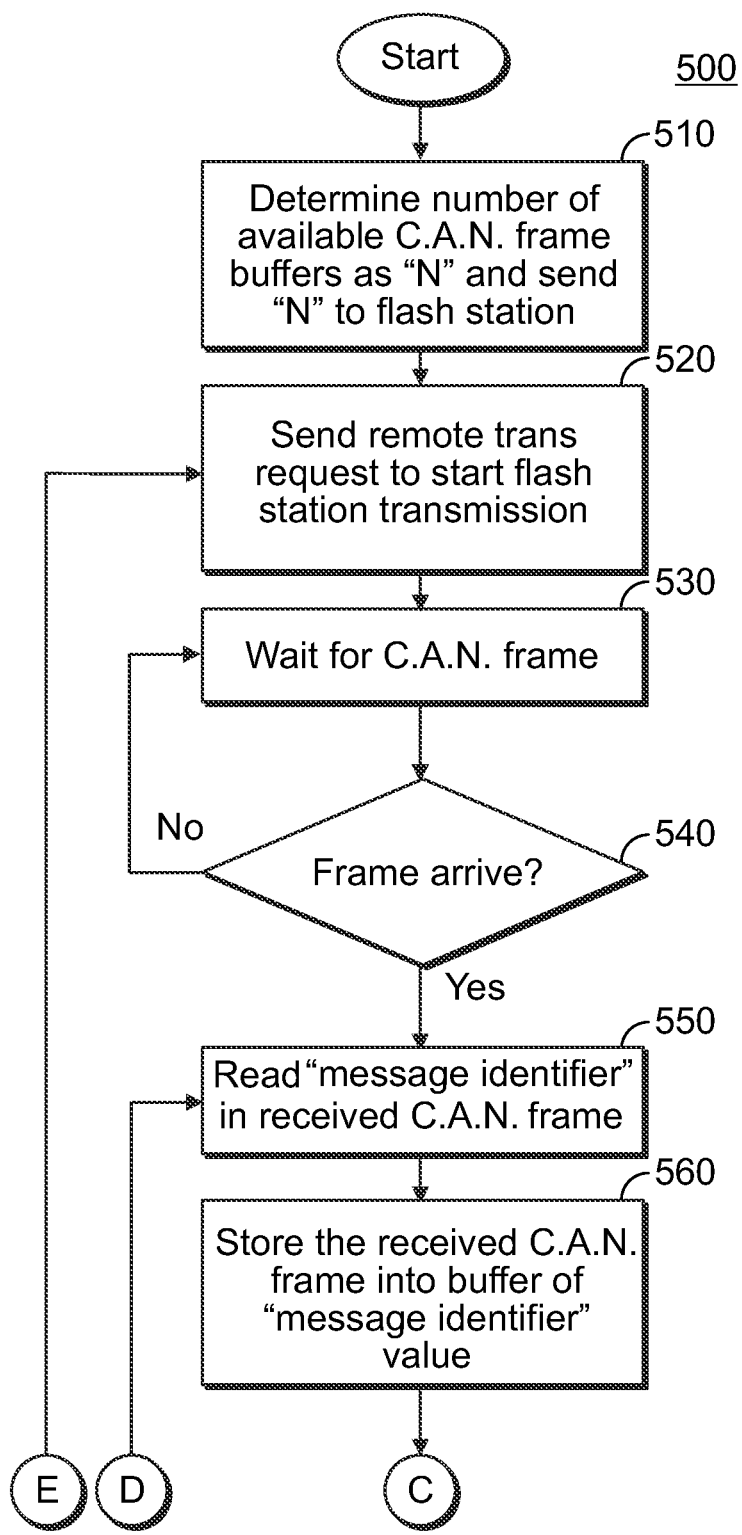
FIGS. 5 and 6 is a depiction of a method of storing information received in C.A.N. data frames into a FLASH memory device.

FIG. 5 depicts steps of a second method, which is a method for a target device such as a microcontroller to program information received in payload portions of C.A.N. data frames into a FLASH memory device 204.

At step 510, the target device 206 determines the number of available C.A.N. frame buffers as they may exist and sets that number equal to "N". As part of step 510, the target device sends the number of available buffers to a FLASH station, such as the FLASH station 202 depicted in FIG. 2.

At step 520, the target device sends a C.A.N. frame to the FLASH programming station instructing that it should start the transmission of C.A.N. frames having payloads that are to be written into a FLASH memory device. At step 540, the method waits for a C.A.N. frame to arrive from the FLASH programming station. Once a C.A.N. frame arrives, at step 550 the target device reads the message identifier that is in the received C.A.N. frame. At step 560, the received C.A.N. frame is written in its entirety into the buffer identified by the message identifier that was appended to the C.A.N. frame received at step 550.

It is important to note that in a preferred embodiment, an acknowledgement or "ACK" frame is sent from the target device to the programming station when the buffer counter value of "N"=0. An "ACK" can also be sent when the buffer counter value is equal to one-half N or N/2.

Figure 6:
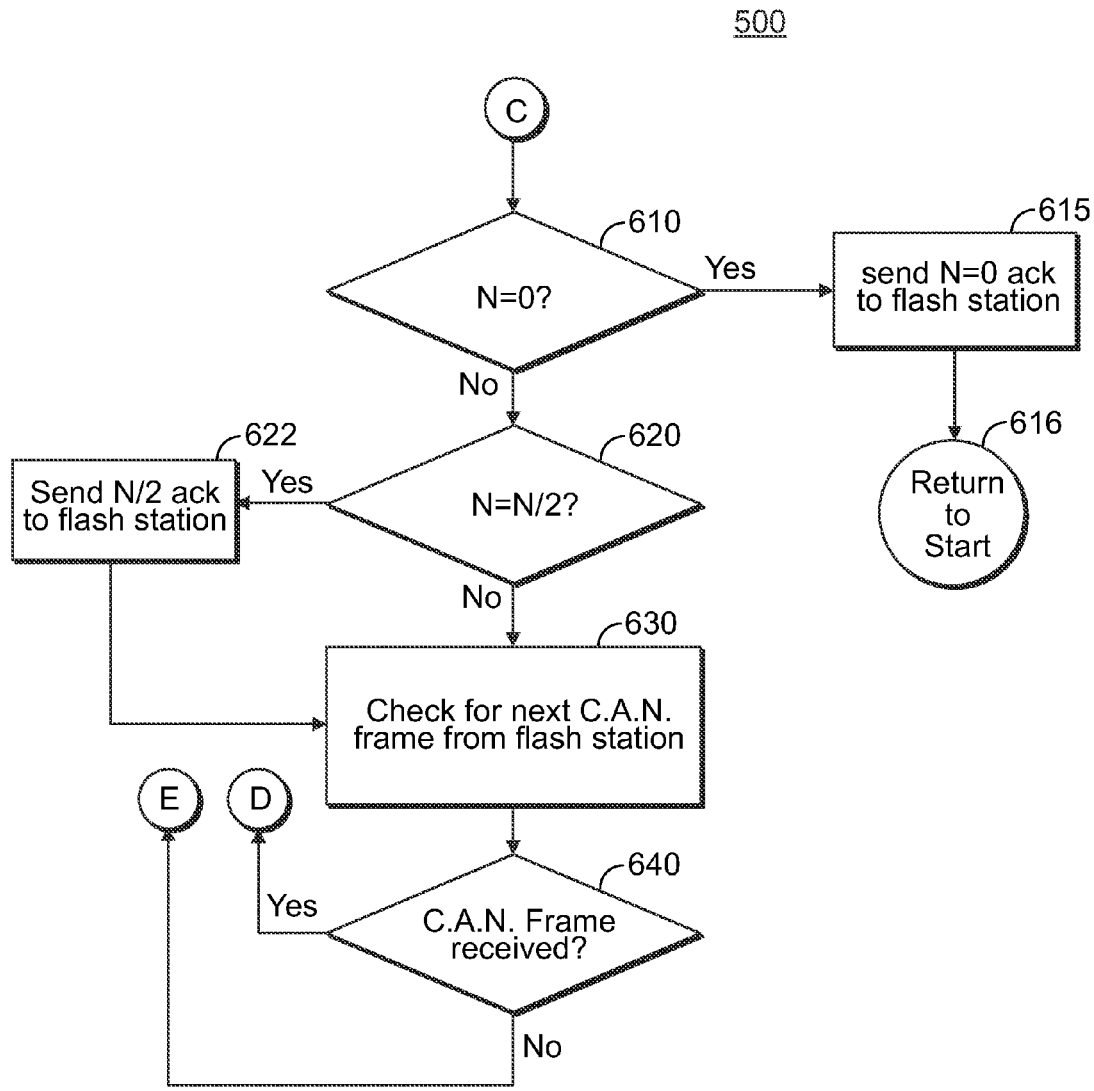

At step 610, a test is conducted to determine if all of the N available buffers have been sent a frame. If the result of that test is true, at step 615, an acknowledgement is sent from the target device to the FLASH station when N=0 to indicate to the FLASH station that the target device has completed processing the contents of all of the of frame buffers. The method depicted in FIGS. 5 and 6 then returns to the "start" of the method at step 616.

In another embodiment, at a step 620, an "N/2" acknowledgement is sent when the value of N has been decremented to half of its original value to indicate to the FLASH station that half the available buffers have been processed by the target device. The flash station gets an ACK indicating that the target device has completed processing of the set of buffers that it is next going to send CAN frames to. So, if the buffer counter=0, the flash station gets notified that the target device completed processing up to N/2 buffers, so it can proceed to send more frames sooner rather than waiting for the target device to complete all N Buffers. In this way, when the buffer counter=N/2, and if the flash station has received an ACK indicating the target device has completed the second half of buffers (including N=0), the flash station "knows" that it can proceed to send CAN frames for the remaining available buffers.

At step 630, the method waits for the next C.A.N. frame, and, if it has not arrived, the program returns, via the no branch from 640, to step 520 where the target station sends another request to the FLASH station to begin transmission. If another C.A.N. frame has been received, the program flow returns, via the yes branch from 640, to step 550 where the C.A.N. message identifier is reread in the next C.A.N. frame that is received.

Those of ordinary skill in the art will recognize that while the methods and apparatus described above find application with the transmission of a C.A.N. frame over a C.A.N. bus, it is equally applicable to the transmission of other types of frames over other networks. For purposes of claim construction therefore, the term "C.A.N. frame" should be construed to include other frames such as standard Ethernet frames, I.E.E.E. 802.3 MAC frames which are similar to Ethernet frames, or any other grouping of binary digits that represent a block of data.

The foregoing description is for purposes of illustration only. The true scope of the invention is set forth in the appurtenant claims in view of the description set forth above.

The invention claimed is:

1. A method of transmitting C.A.N.-type frames over a C.A.N.-type bus, the method comprising:
    reading data from a first memory device;
    encapsulating data read from the first memory device, in a plurality of over-head fields to form a plurality of C.A.N.-type frames;
    appending to each C.A.N.-type frame, a C.A.N. message identifier that corresponds to, and that uniquely identifies, one of N available buffers that are in a remotely-located FLASH memory device programming station, the N available buffers in the remotely-located FLASH memory programming station being sized and arranged to store complete, C.A.N.-type frames, N being a number greater than one, the message identifier corresponding to, and identifying, a particular buffer at the FLASH memory programming station into which a C.A.N.-type frame with a corresponding message identifier is to be stored temporarily by a FLASH programming device that is coupled to a FLASH memory device into which a payload portion of a C.A.N.-type frame is to be transferred by the FLASH programming device, a C.A.N.-type frame comprising a multi-bit, information-bearing payload field, encapsulated in a plurality of over-head fields;
    transmitting a plurality of C.A.N.-type frames with the appended message identifier over a C.A.N. bus to the FLASH memory programming station, the FLASH memory programming station being configured to have a plurality of buffers, each buffer at the FLASH memory programming station being identified by the message identifier appended to a transmitted C.A.N.

frame and each buffer being configured to store a complete C.A.N.-type frame;

repeating steps a) and b) until a number of transmitted messages is equal to N.

2. The method of claim 1, wherein the buffers at the FLASH memory programming station are numbered sequentially and wherein the step of assigning a message identifier that corresponds to, and that identifies, one of the N available frame buffers further comprises assigning an ordinal number corresponding to an ordinal-numbered buffer.

3. The method of claim 2, wherein the step of assigning an ordinal number further comprises assigning ordinal numbers in a sequence corresponding to the ordinal numbers of the C.A.N. frame buffers.

4. A method of transferring C.A.N.-type frames over a C.A.N.-type bus operating at a first data rate, to a target device comprising a FLASH memory device, which is programmable with new data, at a second and lower data rate, the method comprising:

receiving at the target device, a plurality of C.A.N.-type frames, each received C.A.N.-type frame having a C.A.N. frame message identifier appended to it, the C.A.N.-type frames with appended message identifiers being received at the target device over the C.A.N.-type bus at the first data rate, each-message identifier that is appended to a C.A.N.-type frame corresponding to and uniquely identifying one of N C.A.N. frame-length buffers in the target device;

storing at the target device, each received C.A.N.-type frame into a frame buffer identified by the message identifier that is appended to each received C.A.N.-type frame, each frame buffer being sized, shaped and arranged to store entire C.A.N.-type frames;

programming into the FLASH memory device at the second and lower data rate, a payload portion of each received C.A.N.-type frame that was stored in a frame buffer.

5. The method of claim 4, further comprising:

after a C.A.N.-type frame is stored in a frame buffer:

reading a C.A.N.-type frame from a frame buffer that is in the target device;

stripping overhead fields from the C.A.N.-type frame read from a frame buffer to separate a payload portion of the C.A.N.-type frame from overhead fields of the stored C.A.N.-type frame;

storing the payload portion into the FLASH memory device at the second and lower data rate.

6. The method of claim 5, wherein an acknowledgement is sent when N is equal to zero.

7. The method of claim 6, wherein an N/2 acknowledgement is sent when the value of N has been decremented to half of its original value.

* * * * *